US011668305B2

(12) United States Patent
Herrmann

(10) Patent No.: US 11,668,305 B2
(45) Date of Patent: Jun. 6, 2023

(54) VACUUM DEVICE

(71) Applicant: PFEIFFER VACUUM GMBH, Asslar (DE)

(72) Inventor: Steffen Herrmann, Lohra (DE)

(73) Assignee: PFEIFFER VACUUM GMBH, Asslar (DE)

( * ) Notice: Subject to any disclaimer, the term of this patent is extended or adjusted under 35 U.S.C. 154(b) by 236 days.

(21) Appl. No.: 16/922,062

(22) Filed: Jul. 7, 2020

(65) Prior Publication Data

US 2021/0017990 A1    Jan. 21, 2021

(30) Foreign Application Priority Data

Jul. 15, 2019  (EP) .................................... 19186221

(51) Int. Cl.
| | |
|---|---|
| *F04C 25/02* | (2006.01) |
| *F04C 29/02* | (2006.01) |
| *B01D 3/10* | (2006.01) |
| *F04B 39/16* | (2006.01) |
| *F04B 53/04* | (2006.01) |
| *F04C 27/00* | (2006.01) |

(52) U.S. Cl.
CPC .............. *F04C 25/02* (2013.01); *B01D 3/106* (2013.01); *F04B 39/16* (2013.01); *F04B 53/04* (2013.01); *F04C 29/026* (2013.01); *F04C 27/001* (2013.01)

(58) Field of Classification Search
CPC ...... F04C 25/02; F04C 29/026; F04C 29/021; F04C 2240/809; F04C 2240/81; B01D 3/106; F04B 39/16; F04B 53/04; F04B 37/14; F04B 39/02
See application file for complete search history.

(56) References Cited

U.S. PATENT DOCUMENTS

| | | | |
|---|---|---|---|
| 3,698,515 A | | 10/1972 | Dobrowolski |
| 4,676,265 A | * | 6/1987 | Volk .................. F04B 39/04 137/429 |
| 5,053,120 A | * | 10/1991 | Mollmann ........... B01D 36/005 123/25 J |
| 5,348,041 A | * | 9/1994 | Clark ................. B01D 17/0214 137/433 |
| 11,060,515 B1 | * | 7/2021 | Nudelman ........... B01D 36/005 |
| 2016/0367912 A1 | * | 12/2016 | Kennedy ................... C02F 1/40 |
| 2018/0153195 A1 | * | 6/2018 | Rhodes, Jr. ............ B01D 17/12 |

FOREIGN PATENT DOCUMENTS

| | | | |
|---|---|---|---|
| CN | 108825860 A | * 11/2018 | ............. F04C 29/02 |
| JP | S50-29162 B1 | 9/1975 | |
| JP | S59-160088 A | 9/1984 | |
| JP | 06193564 A | * 7/1994 | |
| JP | H06-193564 A | 7/1994 | |
| KR | 101424532 B1 | 8/2014 | |

OTHER PUBLICATIONS

EP Extended Search Report from Corresponding EP Application No. 19186221.8-1007; dated Jan. 16, 2020.

* cited by examiner

*Primary Examiner* — Dominick L Plakkoottam
(74) *Attorney, Agent, or Firm* — Oblon, McClelland, Maier & Neustadt, L.L.P.

(57) ABSTRACT

A vacuum device, in particular to a vacuum pump, includes a reservoir for an operating medium; an outlet connector arranged at or in the reservoir; and a selection device that selectively closes or opens the outlet connector or an outlet line, which is connected via the outlet connector to the reservoir, in dependence on whether the operating medium or water is present at the outlet connector.

17 Claims, 2 Drawing Sheets

VACUUM DEVICE

CROSS-REFERENCE TO RELATED APPLICATION

This application claims priority to European application no. EP 19186221.8, filed Jul. 15, 2019, the content of which is incorporated by reference herein in its entirety.

FIELD OF INVENTION

The present invention relates to a vacuum device, in particular to a vacuum pump, comprising a reservoir for an operating medium; and an outlet connector arranged at or in the reservoir.

BACKGROUND OF PRIOR ART

Operating media such as oil are frequently used in the operation of vacuum devices. Rotary vane pumps are, for example, frequently equipped with an oil mist separator at the exhaust stub. Said oil mist separator e.g. works in accordance with the coalescence principle and separates oil vapor and/or oil droplets from the exhaust gas flow. The liquid oil collects at the base of the separator and is usually connected by a hose to a part of the rotary vane pump under vacuum and is sucked back into said rotary vane pump. An operating medium return device or oil return device is thus formed. It can occur that water vapor and water droplets are also separated and are collected as water in an operating medium reservoir. A return of water is usually unwanted since it can damage the pump through corrosion and can impair the quality of the oil.

SUMMARY OF INVENTION

It is an object of the invention to improve the service life of a vacuum device of the initially named kind.

This object is satisfied by a vacuum device in accordance with claim 1 and in particular in that the vacuum device comprises a selection device that is configured to selectively close or open the outlet connector or an outlet line, which is connected via the outlet connector to the reservoir, in dependence on whether the operating medium or water is present at the outlet connector.

The fact is utilized by the selection device that an operating medium, usually oil, and water form different phases with a relatively precise phase boundary in the reservoir. In this respect, the operating medium in particular floats on top of the water. The phase boundary shifts in its height in dependence on the quantity of water in the reservoir. In accordance with the invention, this relatively clear separation of operating medium and water can be utilized by simple means so that the water does not reach part regions of the vacuum device in which it is unwanted such as in a suction space of a vacuum pump. The vacuum device is thus protected against corrosion and the service life is improved. The quality of the operating medium is also improved, which has a positive effect on friction in the vacuum device and thus likewise improves the service life, in particular of movable parts and their friction partners.

Insofar as it is mentioned in the following that the outlet connector is opened or closed, it is also understood where it is not mentioned separately that the outlet connector can be directly opened or closed, for instance covered, or an outlet line connected thereto can be opened or closed, e.g. via a valve. For the outlet connector can at least be indirectly opened and closed via an outlet line.

Provision is made in accordance with an embodiment that the outlet connector connects the reservoir to an operating medium return device. In this respect, the outlet connector can in particular be closed when water is present at the outlet connector. The return of water can therefore in particular be directly prevented.

The outlet connector can, for example, be connected to a low pressure region of the vacuum device via the outlet line. The fluid present in the reservoir is hereby sucked in. Thus, an operating medium return can be implemented in a simple manner, for example. The sucking in is, however, in particular prevented when water is present at the outlet connector in that the outlet connector is closed by the selection device. In addition, the outlet connector is in particular opened when the operating medium is present thereat.

The outlet connector can, for example, also be a drain connector. Such a connector in particular serves for the leading off or draining of water, but can, for example, also be useful for draining operating media. The drain connector is in particular opened by the selection device when water is present thereat and/or closed when the operating medium is present thereat. The outlet connector and/or drain connector can preferably be arranged at a lowest point of the reservoir.

At least two outlet connectors can also, for example, be arranged at or in the reservoir. In this respect, at least one of the outlet connectors can be opened or closed by a selection device. Selection devices can also be provided for both outlet connectors. Alternatively, a common selection device can, for example, be provided, in particular such a selection device having a float that selectively closes, in particular covers, either the one or the other outlet connector in dependence on the height of the phase boundary between the operating medium and the water. In general, two outlet connectors can be provided, with one outlet connector being provided for the operating medium, and/or with one outlet connector being provided for the water.

In general, an automatic return barrier against water and/or an automatic water drain can be formed by the selection device. The vacuum device is particularly well protected against corrosion and operating medium impairment by both of the above variants, and this in each case by particularly simple means.

The outlet connector can preferably be oriented downwardly or upwardly. In general, the outlet connector can, for example, be formed in a wall of the reservoir or by a line that extends into the reservoir, for example through a wall of the reservoir. The outlet connector can in particular be arranged at a lowest point of the reservoir.

The selection device can, for example, comprise a float. Said float can in particular be configured to float at a phase boundary between water and the operating medium. The selection device can in this respect be configured to either close or open the outlet connector or the outlet line in dependence on the floating height of the float. The float can in particular be configured such that it sinks in the operating medium and rises in water. The float can, for example, have a density that lies between the density of the operating medium and the density of water. It can thus be achieved in a simple manner that the float floats at the phase boundary. In general, the float can e.g. have a spherical shape.

In a further development, the float is itself configured to close the outlet connector, in particular with a hollow body and/or spherical body. An additional valve thus does not have to be provided and the selection device has a particularly simple and thus inexpensive design. The float can close the outlet connector by contacting the outlet connector, for example. A seal, in particular a ring seal, can, for example, be provided at the outlet connector for contact with the float in the closed state. The float can generally close the outlet connector when it reaches the outlet connector together with the phase boundary. In general, the float can close the outlet connector with a hollow, very light and/or spherical section, with this not being absolutely necessary, however. A closure section can, for example, also be provided at a lever separately from a hollow, very light and/or spherical section. The selection device of this further development is particularly simple to manufacture and in particular functions automatically, and indeed without the necessity of an electronic control. The selection device is thus also particularly low-maintenance and cost-effective both in manufacture and operation.

The selection device can, for example, have a positioning device for the float. A particularly reliable positioning and in particular a particularly safe closing are hereby made possible. The positioning device can in particular be configured to position the float below or above the outlet connector, at least in a height range near the outlet connector. The positioning device can, for example, comprise a lever or a cage. However, the positioning device can, for example, also be formed by a wall of the reservoir. Thus, the wall can e.g. be formed as converging, in particular conically converging, toward the outlet connector.

The selection device can alternatively or additionally advantageously have a switch that can e.g. be actuable by the float. This likewise enables a relatively simple design of a selection device. The switch can, for example, be actuable to switch a switch valve at the outlet connector or at or in the outlet line. Alternatively or additionally, the switch can be actuable to switch the vacuum device and/or other functional units on and/or off. Thus, a safety switch-off can, for example, be implemented in a particularly simple manner in the event that an operating medium return line is blocked. Generally, the switch can, for example, also be connected to a warning unit such as to a warning light or a sound generator. The user of the vacuum device can thus be informed in a simple and reliable manner about a disadvantageous filling level, in particular of water, in the reservoir.

The selection device can, for example, have a sensor for determining filling level information. The sensor can, for example, be configured to determine a filling level as a scale value. Such a sensor can also be designated as a continuous sensor. Alternatively, the sensor can, for example, be configured to determine the presence of water and/or operating medium at the sensor. Such a sensor is designated as a binary sensor herein. A binary sensor can, for example, derive the filling level information from an electrical conductivity of a medium, that is water or an operating medium, at the sensor. The binary sensor can e.g. also be configured as a capacitive sensor. The sensor can generally, for example, derive the filling level information from a position, in particular a height, of a float.

Provision is made in a further embodiment that the selection device has a switch valve at the outlet connector or at or in the outlet line. The selection device can in this respect preferably be configured to switch the switch valve in dependence on the filling level information. This embodiment provides a further selection device of simple design. In addition, it provides the advantage that a particularly simple integration of the selection device into a possibly existing control device of the vacuum device is made possible. Thus, the sensor data can, for example, be used by the control device and/or the switch valve can also be controllable by the control device independently of the filling level information. The switch valve can be configured as a solenoid valve, for example.

The outlet connector can generally be opened or closed in dependence on the sensor, for example. Alternatively, it can, for example, be indicated to the user whether the selection device currently keeps the outlet connector open or closed, e.g. whether a float currently contacts the outlet connector and thus closes it or not. In dependence thereon, the user of the vacuum device can take a measure, e.g. can switch off the vacuum device and/or drain water manually. Both measures can also be carried out automatically, in particular in dependence on the sensor.

A sensor, in particular a binary sensor, can, for example, in particular be easily arranged below or above an outlet connector in or at the reservoir. A determination can thus be made in a simple manner whether the operating medium or water is present at the outlet connector and a measure can be taken in dependence thereon, for example, the outlet connector can be blocked or opened.

The reservoir can, for example, have a sight glass, in particular for indicating a liquid filling level, in particular the operating medium filling level and/or water filling level, in the reservoir. The user hereby obtains direct information on the filling level and can take measures in dependence thereon. The sight glass can in particular be arranged at the level of the outlet connector, in particular of an outlet connector for operating media.

The vacuum device can, for example, have an operating medium separator, e.g. an oil mist separator and/or a coalescence separator. The operating medium separator can preferably be provided for the separation of the operating medium from a gas flow, in particular an exhaust gas flow, into the reservoir.

The vacuum device can in particular be a vacuum pump, in particular a rotary displacement vacuum pump, for example a rotary vane vacuum pump. The vacuum pump can be oil-lubricated, for example. The operating medium can generally have or be oil, for example.

BRIEF DESCRIPTION OF THE DRAWINGS

The invention will be explained only by way of example in the following with reference to the schematic drawings.

DETAILED DESCRIPTION OF THE INVENTION

Figure 1:
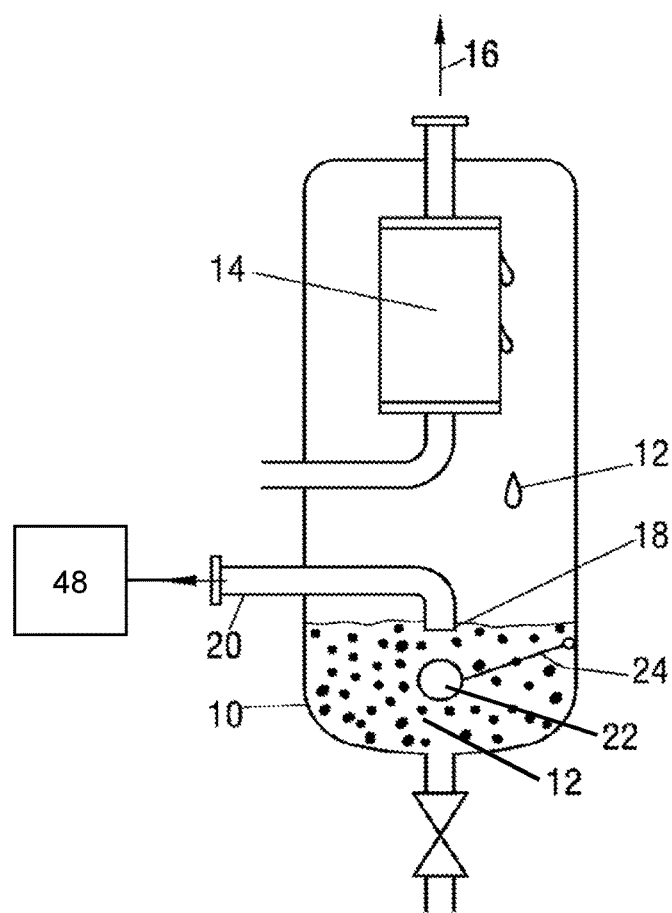
FIGS. 1 and 2 show an embodiment of the invention with an operating medium reservoir and a selection device in two different operating states.
Figure 2:
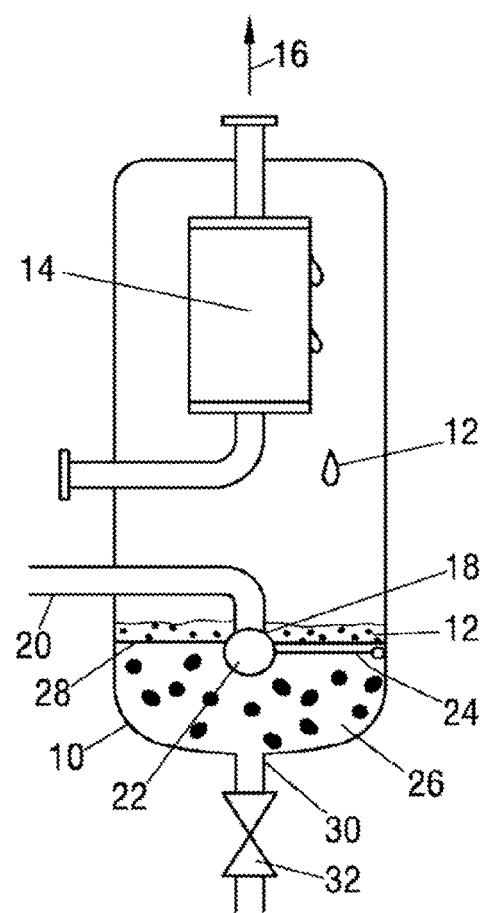

A reservoir 10 for receiving an operating medium 12, which is separated from a gas flow 16 via an operating medium separator 14, is respectively shown in FIGS. 1 and 2. The arrangement shown in FIGS. 1 and 2 is part of a vacuum device otherwise not shown in more detail, for example of a vacuum pump. The gas flow 16 is in particular an exhaust gas flow of such a vacuum pump.

An outlet connector 18 is arranged in the reservoir 10 and is connected to a low pressure region of the vacuum device via an outlet line 20. As long as the outlet connector 18 is immersed in the operating medium 12 and is not blocked, the operating medium 12 is sucked in through the outlet connector 18 and the outlet line 20 and is thus conveyed to a destination location, such as an operating medium return device 48. An operating medium return is hereby in particular implemented.

A float 22 is provided in the reservoir and is positioned relative to the outlet connector 18 via a lever 24 when the float 22 approaches the outlet connector 18 or is located in its height range.

The float 22 has a density between the density of the operating medium 12 and the density of water. In the operating state as is shown in FIG. 1, no water is present in the reservoir 10 and the float 22 located in the operating medium 12 drops, possibly down to a boundary.

In FIG. 2, an operating state is, in contrast, shown in which a relatively large quantity of water 26 has collected in the reservoir 10. The float 22 floats due to its density at a phase boundary 28 between the operating medium 12 and the water 26.

So much water is present in the reservoir 10 in FIG. 2 that the phase boundary 28 and the float 22 are arranged at the level of the outlet connector 18. In this respect, the float 22 is in contact with the outlet connector 18 and closes the latter itself.

In the state shown in FIG. 2, the outlet connector 18 and the outlet line 20 are therefore closed or blocked. No water 26 can enter the outlet line 20.

A user can, for example, be made aware of this blocked state via a switch or sensor, not shown, or via a sight glass. The user can then open a drain connector 30 or a valve 32 associated with the drain connector 30 to drain the water 26. The excess water 26 is hereby removed, on the one hand, and the outlet connector 18 is opened again, on the other hand, since the float 22 follows the phase boundary 28 downwardly during the draining. The drain valve 32 can, for example, also be automatically actuable, for example in dependence on a switch or a sensor, and/or can be configured as a switch valve The valve 32 can, for example, also be dispensed with if the float 22 is itself additionally configured to close the outlet connector 30 when the phase boundary 28 is located in the outlet connector 30 or only the operating medium 12 is present and the float 22 sinks downwardly in the operating medium 12. In this case, a cage that, for example, guides the float 22 vertically can preferably be provided as the positioning device instead of the lever 24. In principle, however, the outlet connectors 18 and 30 do not have to be arranged in vertical alignment above one another. A selection device can generally also only be provided for the drain connector 30.

Figure 3:
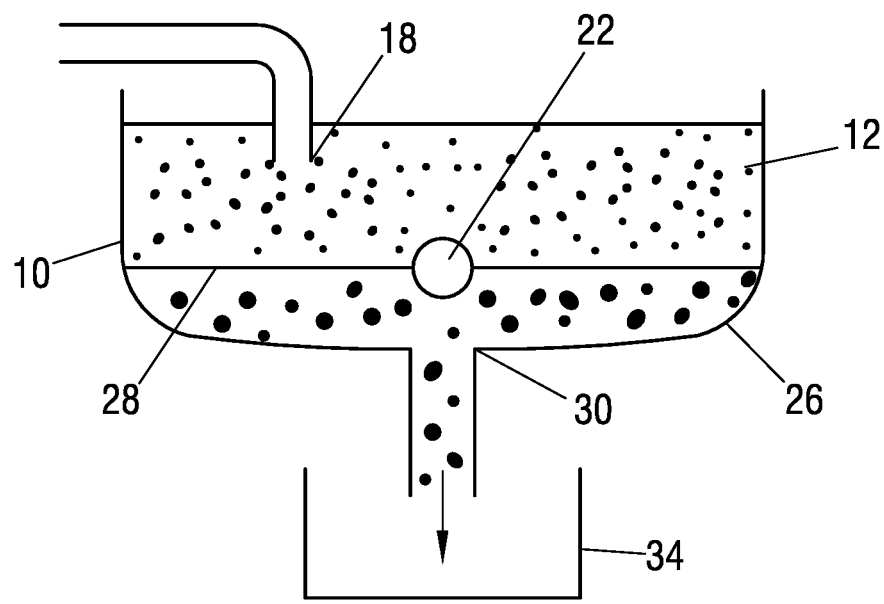
FIG. 3 shows a further embodiment of a selection device.

A further embodiment of the reservoir and the selection device is shown in FIG. 3. A reservoir 10 having outlet connectors 18 and 30 is provided. A float 22 is arranged above an upwardly oriented outlet connector 30 by a positioning device, not shown.

The phase boundary 28 is located between the outlet connectors 18 and 30 in FIG. 3. The float 22 floats at the phase boundary 28.

The float 22 is configured to close the outlet connector 30 in contact therewith. In the operating state shown in FIG. 3, the float 22 is, however, raised by a relatively large quantity of water such that the outlet connector 30 is open. The water 26 can thus flow off into a waste water container 34, for example. The water 26 is therefore automatically drained off by the selection device.

The Figures are not to scale and it is understood that, in the operation of the embodiment in accordance with FIG. 3, the float 22 will usually only rise slightly and open a comparatively small gap at the outlet connector 30 since the water 26 so-to-say runs off continuously and a large quantity of water essentially cannot be collected. The relatively large height of the float 22 shown in FIG. 3 therefore only serves for illustration.

In a similar manner as in the embodiment of FIGS. 1 and 2, the outlet connector 18 of FIG. 3 is connected to a low pressure region and sucks the operating medium 12 to a destination location. Since the selection device or the float 22 is only effective at the outlet connector 30 here, the outlet connector 18 is substantially never closed. A particularly reliable operating medium return can hereby be implemented, for example. However, it is also conceivable that the float 22 is also configured to close the outlet connector 18 when the phase boundary 28 is located at its level. An additional float or another type of selection device can also be provided. In addition to the largely permanent draining of water 26 in accordance with FIG. 3, a redundantly effective selection device can thus, for example, be provided in order to provide a particularly reliable protection against corrosion, for example.

Figure 4:
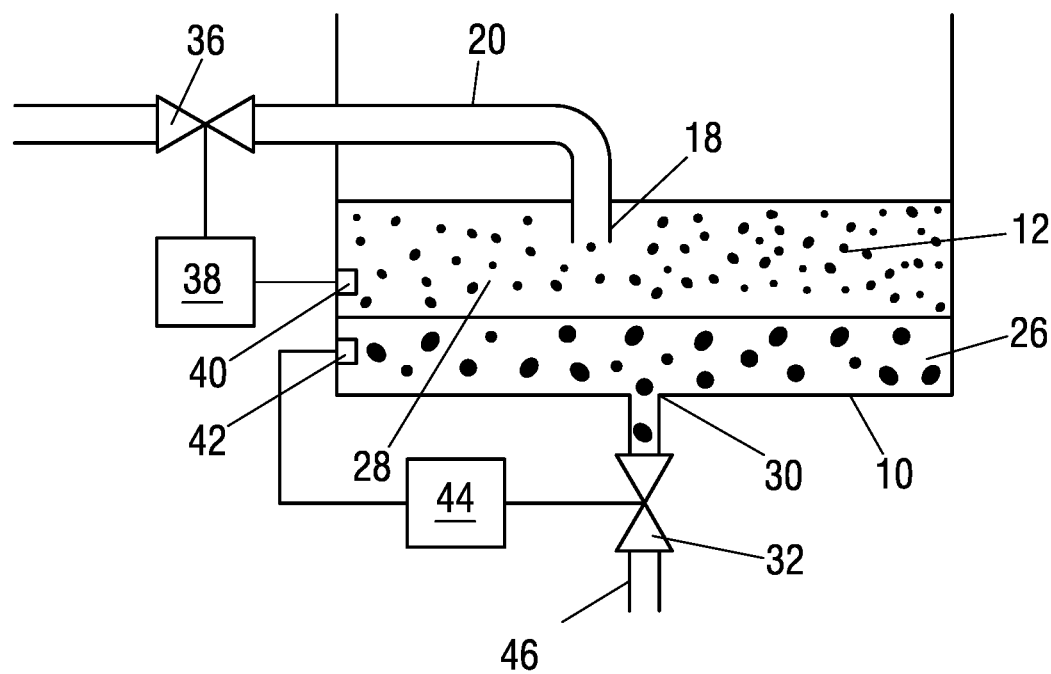
FIG. 4 shows a third embodiment of a selection device.

An embodiment without a float is shown in FIG. 4, wherein floats could, however, additionally also be provided. The operating medium 12 and water 26 are present separated in phases in a reservoir 10. An outlet connector 18 is arranged immersed in the operating medium 12 and sucks the operating medium 12 via an outlet line 20 to a destination location as long as a switch valve 36 is open.

The switch valve 36 is opened or closed via an actuation device 38 in dependence on a sensor 40. The sensor 40 is preferably a binary sensor in the sense described above, that is a sensor of such a kind that determines whether the operating medium 12 or water 26 is present in it. The sensor 40 can, for example, measure a conductivity or a capacity of a surrounding medium for this purpose. Alternatively or additionally, a continuous sensor could also be provided.

The sensor 40 is arranged slightly below the outlet connector 18. If the sensor 40 detects water 26 as the medium surrounding it, that is if the phase boundary 28 has reached a certain height, the actuation device 38 effects a closure of the switch valve 36. The switch valve 36 is only opened when the sensor 40 detects the operating medium 12 again. A sucking in of water 26 via the outlet connector 18 is thus substantially precluded. A slight height difference between the outlet connector 18 and the sensor 40 can in particular effect a safety distance between the phase boundary and the outlet connector 18. A sucking in of water 26 is thus substantially completely prevented, at least with the exception of water portions that have not yet completely separated from the operating medium phase 12.

A further sensor 42 is provided via a further actuation device 44 for controlling a switch valve 32. The switch valve 32 is provided for blocking or opening a drain line 46 and a drain connector or outlet connector 30. In comparison with the switch valve 36, the switch valve 32 is actuated substantially in reverse via the actuation device 44 in dependence on the sensor 42. Therefore, if the sensor 42 detects water 26, which corresponds to the representation of FIG. 4, the switch valve 32 is opened by the actuation device 44 and the water 26 is drained up to just below the sensor 42. For the sensor 42 then, in turn, detects the operating medium 12 and the switch valve 32 is closed.

It is understood that one of the switch valves 36 or 32 already forms an effective selection device with an associated sensor 40 or 42. However, both variants can, as shown, also be provided at the same time to achieve a redundant and particularly safe selection device, for example.

Whereas the examples shown in the Figures only show sucking outlet connectors 18 for the operating medium 12, it is understood that such a low pressure conveying is not absolutely necessary. Instead, an outlet connector 18 can, for example, also be arranged such that the operating medium 12 can flow off through it due to gravity.

REFERENCE NUMERAL LIST 10 reservoir
12 operating medium
14 operating medium separator
16 gas flow
18 outlet connector
20 outlet line
22 float
24 lever
26 water
28 phase boundary
30 outlet connector
32 valve
34 waste water container
36 switch valve
38 actuation device
40 sensor
42 sensor
44 actuation device
46 drain line

What is claimed is:

1. A vacuum device comprising:
a reservoir for an operating medium;
an outlet connector arranged at or in the reservoir, wherein the outlet connector connects the reservoir to an operating medium return device; and
a selection device that is configured to selectively close or open the outlet connector or an outlet line, which is connected via the outlet connector to the reservoir, in dependence on whether the operating medium or water is present at the outlet connector,
wherein the outlet connector is closed when water is present at the outlet connector and the outlet connector is opened when the operating medium is present at the outlet connector.

2. The vacuum device in accordance with claim 1, wherein the vacuum device is a vacuum pump.

3. The vacuum device in accordance with claim 1, wherein the outlet connector is connected to a low pressure region via the outlet line.

4. The vacuum device in accordance with claim 1, further comprising a drain connector.

5. The vacuum device in accordance with claim 1, wherein one or more additional outlet connectors are arranged at or in the reservoir; and wherein at least one of the outlet connectors can be opened or closed by the selection device.

6. The vacuum device in accordance with claim 1, wherein the outlet connector is oriented downwardly or upwardly.

7. The vacuum device in accordance with claim 1, wherein the selection device comprises a float that is adapted to float at a phase boundary between water and the operating medium; and wherein the selection device is configured to close or open the outlet connector or the outlet line in dependence on the floating height of the float.

8. The vacuum device in accordance with claim 7, wherein the float is itself configured to close the outlet connector.

9. The vacuum device in accordance with claim 7, wherein the selection device has a positioning device for the float.

10. The vacuum device in accordance with claim 7, wherein the selection device has a switch; and wherein the switch is actuable by the float.

11. The vacuum device in accordance with claim 1, wherein the selection device has a sensor for determining filling level information.

12. The vacuum device in accordance with claim 11, wherein the sensor is configured to determine whether the operating medium or water is present at the sensor.

13. The vacuum device in accordance with claim 11, wherein the selection device has a switch valve at the outlet connector or at or in the outlet line; and wherein the selection device is configured to switch the switch valve in dependence on the filling level information.

14. The vacuum device in accordance with claim 1, wherein the vacuum device has an operating medium separator that is provided for the separation of the operating medium from a gas flow into the reservoir.

15. The vacuum device in accordance with claim 7, wherein the float is attached to a side wall of the reservoir via a lever.

16. The vacuum device in accordance with claim 1, wherein the reservoir includes a drain connector that extends through a bottom wall of the reservoir and the outlet line extends through a side wall of the reservoir at a position higher than the drain connector.

17. A vacuum device comprising:
a reservoir for an operating medium;
a drain arranged at or in the reservoir;
an outlet connector arranged at or in the reservoir in a position above the drain; and
a selection device that is configured to selectively close or open the outlet connector or an outlet line, which is connected via the outlet connector to the reservoir, in dependence on whether the operating medium or water is present at the outlet connector,
wherein the selection device comprises a float that is adapted to float at a phase boundary between water and the operating medium; and wherein the selection device is configured to close or open the outlet connector or the outlet line in dependence on the floating height of the float, and
wherein the float is itself configured to close the outlet connector or the outlet line.

* * * * *